(12) United States Patent
Peng et al.

(10) Patent No.: US 11,764,689 B2
(45) Date of Patent: Sep. 19, 2023

(54) FLYBACK POWER-CONVERTING DEVICE WITH ZERO-VOLTAGE SWITCHING AND METHOD FOR FLYBACK CONVERTING POWER WITH ZERO-VOLTAGE SWITCHING

(71) Applicant: Chicony Power Technology Co., Ltd., New Taipei (TW)

(72) Inventors: Tso-Jen Peng, New Taipei (TW); Ssu-Hao Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 106 days.

(21) Appl. No.: 17/471,652

(22) Filed: Sep. 10, 2021

(65) Prior Publication Data

US 2021/0408920 A1 Dec. 30, 2021

Related U.S. Application Data

(63) Continuation-in-part of application No. 16/744,491, filed on Jan. 16, 2020, now abandoned.

(Continued)

(30) Foreign Application Priority Data

Sep. 9, 2019 (TW) .................... 108132489

(51) Int. Cl.
*H02M 3/335* (2006.01)
*H02M 1/08* (2006.01)
*H02M 1/34* (2007.01)

(52) U.S. Cl.
CPC ....... *H02M 3/33569* (2013.01); *H02M 1/083* (2013.01); *H02M 1/34* (2013.01); *H02M 3/33507* (2013.01)

(58) Field of Classification Search
CPC ........... H02M 3/3353; H02M 3/33507; H02M 2001/342; H02M 2001/344; H02M 1/34; H02M 3/33569; H02M 1/083
See application file for complete search history.

(56) References Cited

U.S. PATENT DOCUMENTS 5,471,376 A 11/1995 Tsai et al.
5,691,890 A 11/1997 Hyde
(Continued)

FOREIGN PATENT DOCUMENTS

CN 2453603 Y 10/2001
CN 201118530 Y 9/2008
(Continued)

*Primary Examiner* — Harry R Behm
(74) *Attorney, Agent, or Firm* — Andrew M. Calderon; Calderon Safran & Cole, P.C.

(57) ABSTRACT

A flyback power-converting device includes a transformer circuit, a clamp damping circuit, a first switch, a voltage-reducing circuit and a second switch. The clamp damping circuit and the first switch are coupled to the transformer circuit. The voltage-reducing circuit and the second switch are coupled in series between the clamp damping circuit and the transformer circuit. Through switching of the first switch, the transformer circuit converts an input power to generate a first converted voltage and to enable the clamp damping circuit to store an inductive energy. In addition, when the second switch is turned on, the clamp damping circuit releases the inductive energy to the transformer circuit via the voltage-reducing circuit, so that the transformer circuit generates a second converted voltage according to the inductive energy.

9 Claims, 18 Drawing Sheets

Related U.S. Application Data

(60) Provisional application No. 62/800,048, filed on Feb. 1, 2019.

(56) References Cited

U.S. PATENT DOCUMENTS

| | | | |
|---|---|---|---|
| 6,069,803 A | 5/2000 | Cross | |
| 6,295,213 B1 | 9/2001 | Smith | |
| 6,304,460 B1 | 10/2001 | Cuk | |
| 6,473,318 B1 | 10/2002 | Qian et al. | |
| 10,181,782 B2 * | 1/2019 | Lin | H02M 1/083 |
| 2001/0019490 A1 | 9/2001 | Igarashi et al. | |
| 2009/0257254 A1 | 10/2009 | Leu | |
| 2014/0085937 A1 | 3/2014 | Chen et al. | |
| 2015/0171757 A1 | 6/2015 | Choi et al. | |
| 2016/0365801 A1 | 12/2016 | Phadke | |
| 2017/0025958 A1 | 1/2017 | Yu et al. | |
| 2018/0226895 A1 | 8/2018 | Chang et al. | |
| 2019/0044449 A1 | 2/2019 | Dai et al. | |

FOREIGN PATENT DOCUMENTS

| | | |
|---|---|---|
| CN | 101562406 A | 10/2009 |
| CN | 201733220 U | 2/2011 |
| CN | 102097945 A | 6/2011 |
| CN | 102122890 A | 7/2011 |
| CN | 102624235 A | 8/2012 |
| CN | 102651615 A | 8/2012 |
| CN | 102891594 A | 1/2013 |
| CN | 104300795 A | 1/2015 |
| CN | 106253680 A | 12/2016 |
| CN | 108075664 A | 5/2018 |
| JP | 2006087284 A | 3/2006 |
| TW | I1399911 B1 | 6/2013 |
| TW | I538369 B | 6/2016 |
| TW | 201840110 A | 11/2018 |
| TW | I649947 B | 2/2019 |

* cited by examiner

FLYBACK POWER-CONVERTING DEVICE WITH ZERO-VOLTAGE SWITCHING AND METHOD FOR FLYBACK CONVERTING POWER WITH ZERO-VOLTAGE SWITCHING

CROSS-REFERENCES TO RELATED APPLICATIONS

This application is a continuation-in-part (CIP) of application Ser. No. 16/744,491, filed on Jan. 16, 2020 with claiming the priority benefit of U.S. provisional application Ser. No. 62/800,048, filed on Feb. 1, 2019 and Patent Application No. 108132489 filed in Taiwan, R.O.C. on Sep. 9, 2019. The entirety of the above-mentioned patent applications is hereby incorporated by references herein and made a part of the specification.

BACKGROUND

Technical Field

The present invention relates to a power device, and in particular, to a flyback power-converting device and a method for flyback converting power.

Related Art

With the development of science and technology, electronic devices occupy an important position in our daily lives, and a main power source on which the electronic devices depend is still direct current power. However, a mains is mainly alternating current power. Therefore, the electronic devices are usually coupled to the alternating current power via an adapter, and a power-converting device in the adapter converts the alternating current power of the mains into direct current power, to supply electric power needed by the electronic devices to operate.

In the application of power-converting devices, a flyback converter circuit architecture is the most common. A flyback power-converting device has advantages such as circuit isolation, simple structure and low costs. The flyback power-converting device is mainly an active clamp flyback (ACF) power-converting device and a passive clamp flyback power-converting device (or referred to as an inactive clamp flyback power-converting device). To miniaturize the adapter, the active clamp flyback power-converting device becomes an increasingly valued power-converting technology.

In the active clamp flyback power-converting device, a snubber diode in the passive clamp flyback power-converting device is replaced by an auxiliary switch, to reduce switching loss, and further improve overall efficiency of a converter. In use, to have higher efficiency, the active clamp flyback power-converting device operates in a flyback mode (that is, the auxiliary switch is not working) in light-load, and operates in an active mode (that is, the auxiliary switch is working) in heavy-load. However, when the auxiliary switch is working, a surge current is generated on a secondary side, thereby damaging internal components.

SUMMARY

An embodiment of the present invention provides a flyback power-converting device. The flyback power-converting device includes a transformer circuit, a clamp damping circuit, a first switch, a voltage-reducing circuit, a second switch, a load detection circuit, and a control module. The transformer circuit includes a primary side winding and a secondary side winding inductively coupled to the primary side winding. The clamp damping circuit includes an energy-storage element, a dissipative element and a forward conduction element. A first end of the energy-storage element is coupled to a first end of the primary side winding, the dissipative element is connected in parallel with the energy-storage element, and the forward conduction element is coupled between a second end of the primary side winding and a second end of the energy-storage element. The first switch is coupled between the second end of the primary side winding and the ground. The voltage-reducing circuit is coupled between the second end of the energy-storage element and the second end of the primary side winding. The second switch is connected in series with the voltage-reducing circuit between the second end of the energy-storage element and the second end of the primary side winding. The load detection circuit is coupled between the first switch and the ground. The control module connects the first switch to the second switch. The control module is configured to receive a load signal transmitted from the load detection circuit to determine a load condition. The control module is further configured to: in response to the load condition being in a light load condition, enable the flyback power-converting device to enter a flyback mode, and in the flyback mode, control the second switch to be turned off, and enable the first switch to be periodically turned on and off according to a first period, where through switching of the first switch, the transformer circuit converts an input power to generate a first converted voltage, when the first switch is turned off, the forward conduction element is turned on, the transformer circuit charges the energy-storage element via the forward conduction element to enable the energy-storage element to store an inductive energy, and when the first switch is turned on, the energy-storage element releases the inductive energy to the dissipative element; in response to the load condition being in a heavy load condition, enable the flyback power-converting device to enter an active mode; and in the active mode, periodically execute the following actions sequentially within a plurality of periods according to a second period: during a first time within each period, controlling the first switch to be turned on, and controlling the second switch to be turned off; during a second time within each period, controlling the first switch to be turned off; and during a third time within each period, controlling the second switch to be turned on, where during the first time, the primary side winding receives an input power to store a conversion energy therein. During the second time, the forward conduction element is turned on, and the transformer circuit charges the energy-storage element via the forward conduction element to enable the energy-storage element to store an inductive energy. During the third time, the voltage-reducing circuit generates a voltage drop in a same polarity direction as a voltage on the primary side winding, so that the energy-storage element releases the inductive energy to the transformer circuit via the voltage-reducing circuit, and the transformer circuit generates a second converted voltage according to the inductive energy.

An embodiment of the present invention provides a method for flyback converting power, performed by a control module. The method for flyback converting power includes: receiving a load signal transmitted from a load detection circuit to determine a load condition; in response to the load condition being in a light load condition, enabling the flyback power-converting device to enter a flyback mode; and in the flyback mode, controlling a second switch to be turned off, and enabling a first switch to be periodically turned on and off according to a first period, where through switching of the first switch, the transformer circuit converts an input power to generate a first converted voltage, when the first switch is turned off, a forward conduction element is turned on, and a transformer circuit charges an energy-storage element via the forward conduction element to enable the energy-storage element to store an inductive energy, and when the first switch is turned on, the energy-storage element releases the inductive energy to the dissipative element; in response to the load condition being in a heavy load condition, enabling a flyback power-converting device to enter an active mode; and in the active mode, periodically executing the following actions sequentially within a plurality of periods according to a second period: during a first time within each period, controlling the first switch to be turned on, and controlling the second switch to be turned off; during a second time within each period, controlling the first switch to be turned off; and during a third time within each period, controlling the second switch to be turned on, where during the first time, the primary side winding receives an input power to store a conversion energy therein. During the second time, the forward conduction element is turned on, and the transformer circuit charges the energy-storage element via the forward conduction element to enable the energy-storage element to store an inductive energy. During the third time, the voltage-reducing circuit generates a voltage drop in a same polarity direction as a voltage on the primary side winding, so that the energy-storage element releases the inductive energy to the transformer circuit via the voltage-reducing circuit, and the transformer circuit generates a second converted voltage according to the inductive energy.

In conclusion, according to the flyback power-converting device and the method for flyback converting power of the present invention, a surge current can be prevented from being generated on a secondary side when the clamp damping circuit releases energy via an auxiliary switch (that is, the second switch), thereby reducing impact on internal components to extend a product service time, restoring the inductive energy to improve produce efficiency, and selecting a relatively low semiconductor rated voltage or current value to reduce costs.

DETAILED DESCRIPTION

Figure 1:
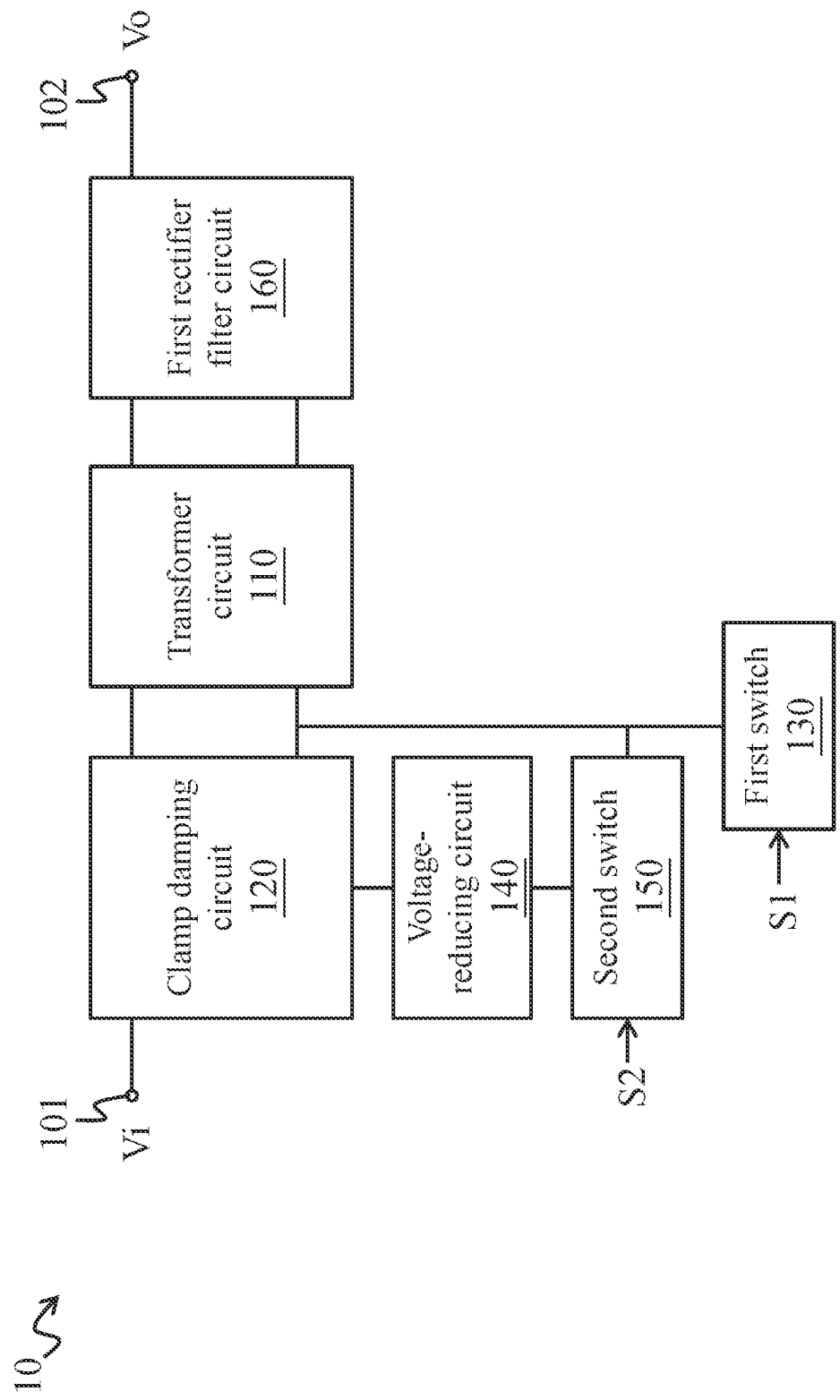
FIG. 1 is a block diagram of functions of a flyback power-converting device according to an embodiment.

Referring to FIG. 1, a flyback power-converting device 10 includes a transformer circuit 110, a clamp damping circuit 120, a first switch 130, a voltage-reducing circuit 140 and a second switch 150.

The clamp damping circuit 120 is coupled to a primary side of the transformer circuit 110. In this case, the clamp damping circuit 120 is connected in parallel with the primary side of the transformer circuit 110, that is, the clamp damping circuit 120 is coupled between a first end and a second end of the primary side of the transformer circuit 110. In addition, the first end of the primary side of the transformer circuit 110 is further coupled to an input end 101.

The first switch 130 is coupled between the second end of the primary side of the transformer circuit 110 and a ground. In this case, through switching of the first switch 130, the transformer circuit 110 converts an input power Vi to generate a converted voltage (referred to as a first converted voltage below) and to enable the clamp damping circuit 120 to store an inductive energy.

Figure 2:
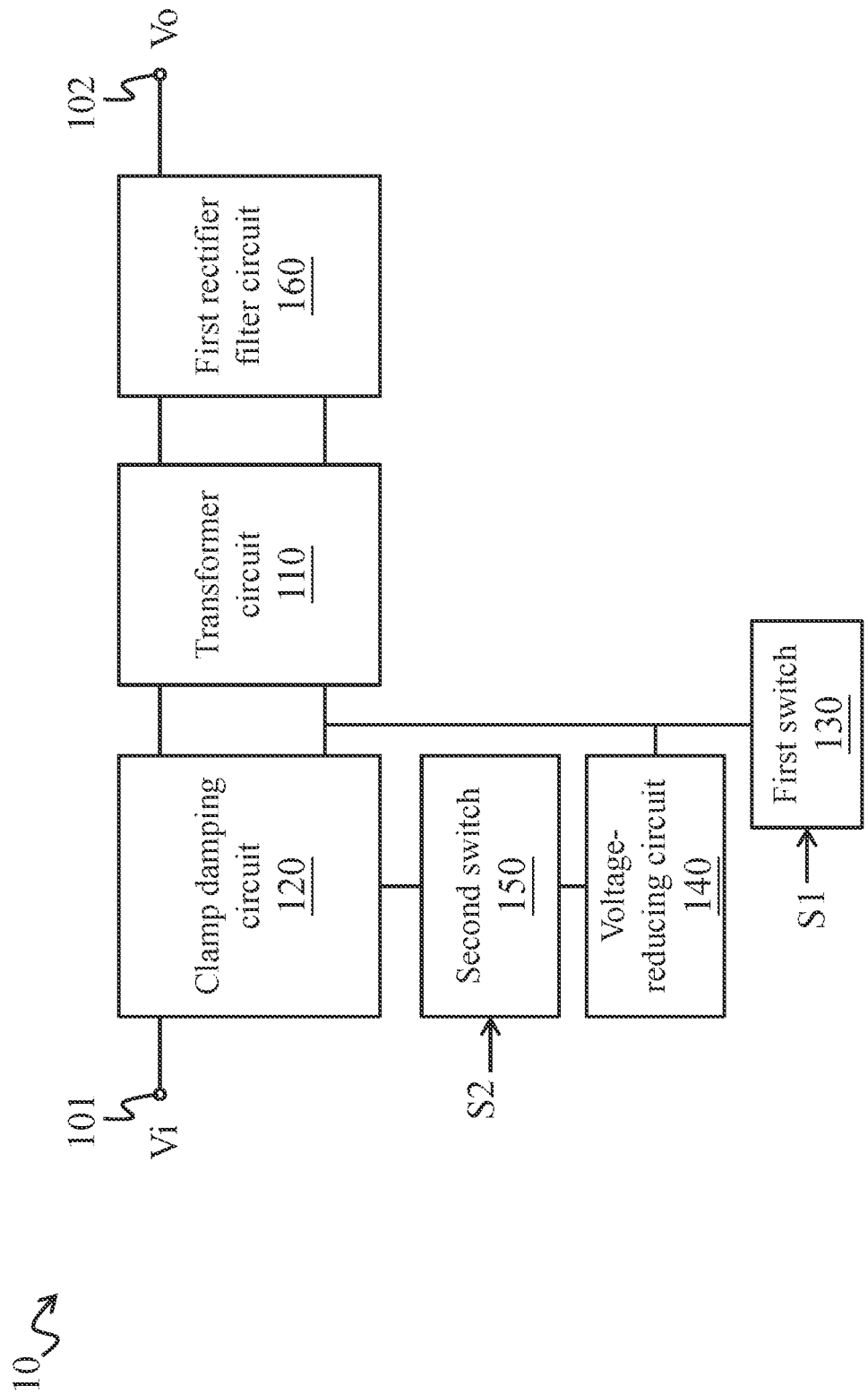
FIG. 2 is a block diagram of functions of a flyback power-converting device according to another embodiment.

A energy-releasing path is further coupled between the clamp damping circuit 120 and the second end of the primary side of the transformer circuit 110. The voltage-reducing circuit 140 and the second switch 150 are disposed on the energy-releasing path. In other words, the voltage-reducing circuit 140 is coupled between the clamp damping circuit 120 and the second end of the primary side of the transformer circuit 110. The second switch 150 is coupled in series with the voltage-reducing circuit 140 between the clamp damping circuit 120 and the second end of the primary side of the transformer circuit 110. In this case, the second switch 150 is configured to turn on or cut off the energy-releasing path. When the second switch 150 is turned on, the clamp damping circuit 120 releases the inductive energy to the transformer circuit 110 via the voltage-reducing circuit 140, so that the transformer circuit 110 generates another converted voltage (referred to as a second converted voltage below) according to the inductive energy. In an example, the voltage-reducing circuit 140 is coupled between the clamp damping circuit 120 and a first end of the second switch 150, and a second end of the second switch 150 is coupled to the second end of the primary side of the transformer circuit 110, as shown in FIG. 1. In another example, the clamp damping circuit 120 is coupled to the first end of the second switch 150, and the voltage-reducing circuit 140 is coupled between the second end of the second switch 150 and the second end of the primary side of the transformer circuit 110, as shown in FIG. 2. In some embodiments, the second converted voltage is less than the first converted voltage.

In some embodiments, the flyback power-converting device 10 further includes: a rectifier filter circuit (referred to as a first rectifier filter circuit 160 below). The first rectifier filter circuit 160 is coupled between a secondary side of the transformer circuit 110 and an output end 102. When the transformer circuit 110 generates the first converted voltage, the first rectifier filter circuit 160 receives the first converted voltage and generates an output voltage Vo at the output end 102 according to the first converted voltage. When the transformer circuit 110 generates the second converted voltage, the first rectifier filter circuit 160 cuts off an output path because the second converted voltage is less than the output voltage Vo.

Figure 3:
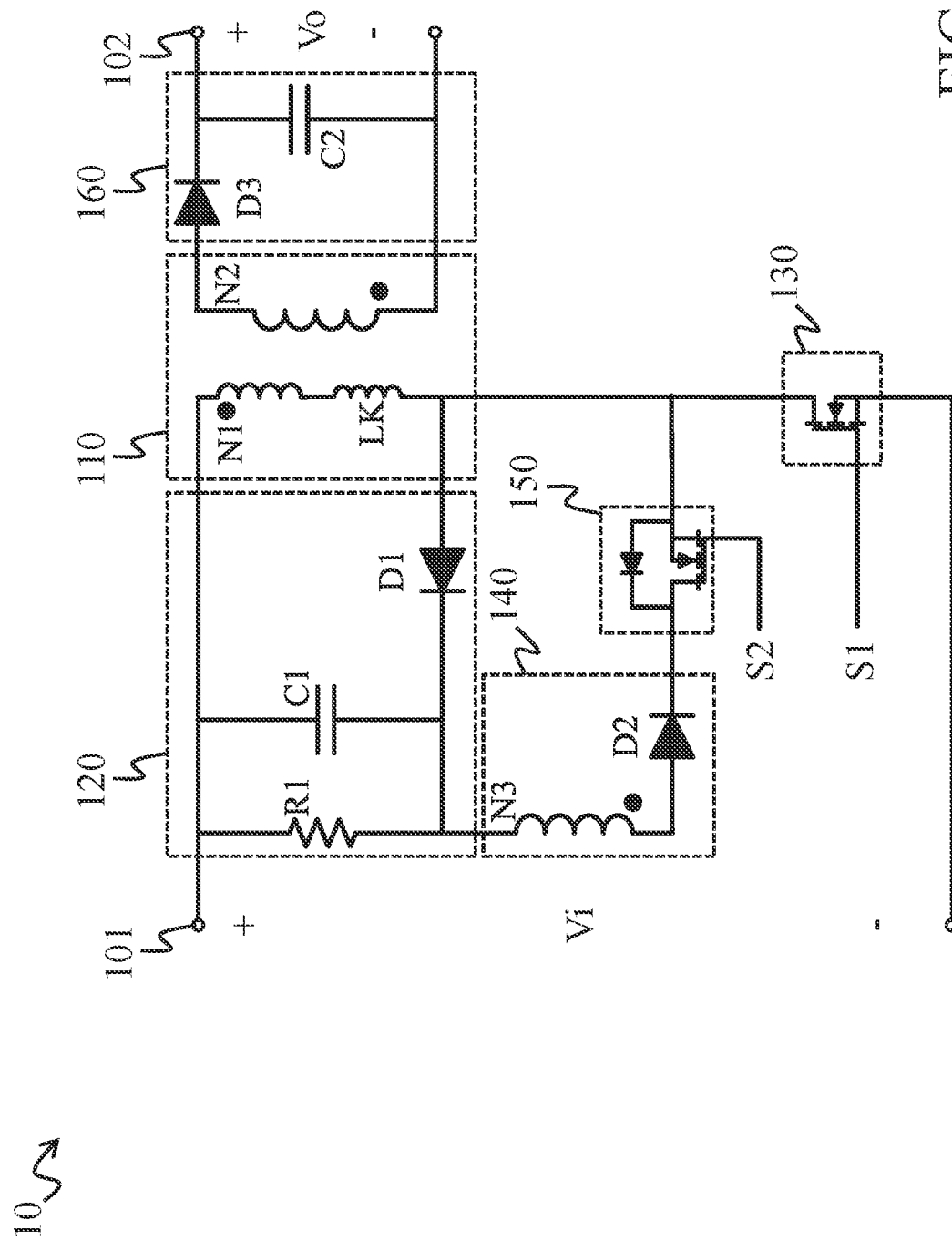
FIG. 3 is an exemplary brief circuit diagram of the flyback power-converting device of FIG. 1.
Figure 4:
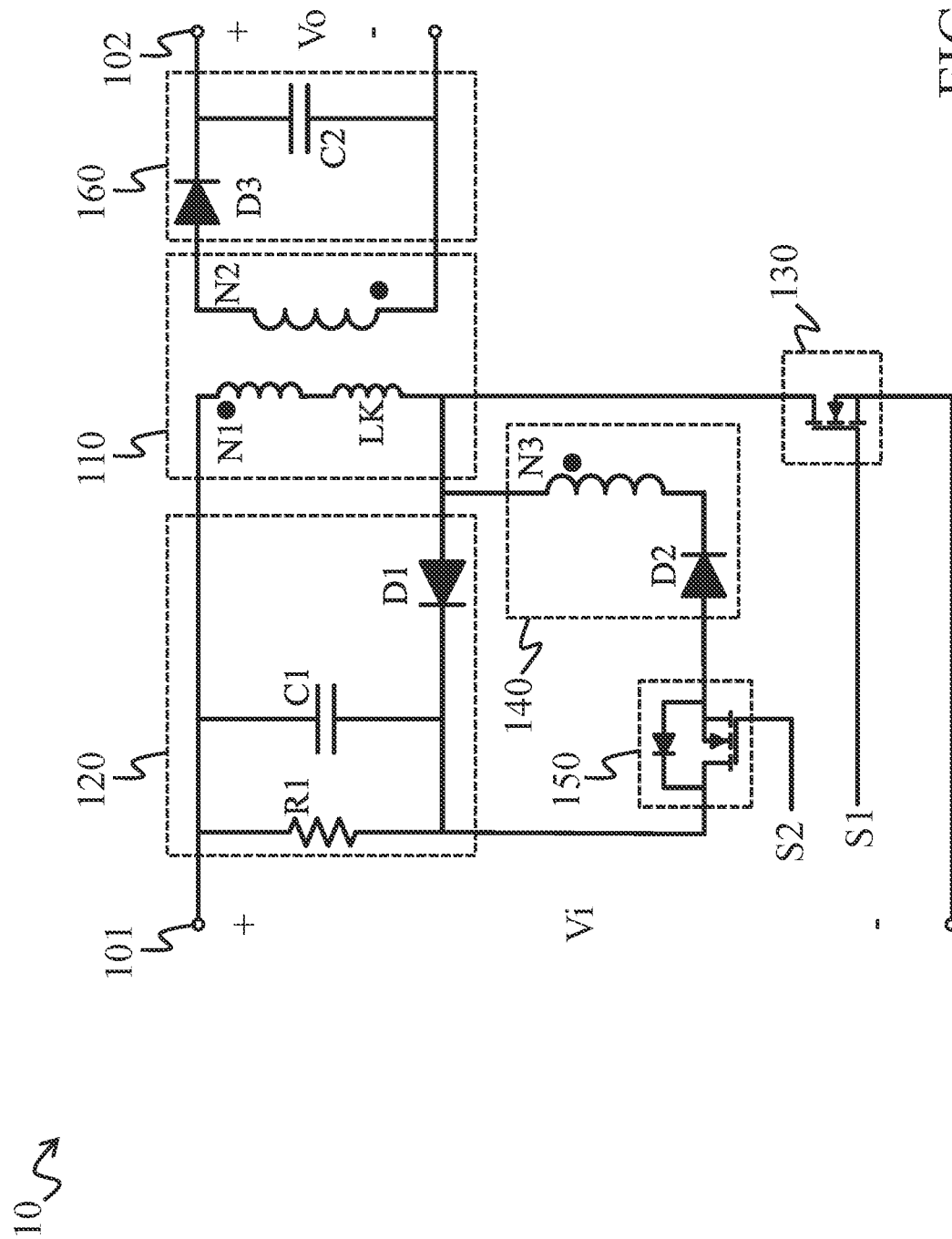
FIG. 4 is an exemplary brief circuit diagram of the flyback power-converting device of FIG. 2.

In some embodiments, referring to FIG. 3 and FIG. 4, the transformer circuit 110 includes a primary side winding N1 and a secondary side winding N2. The primary side winding N1 and the secondary side winding N2 are inductively coupled to each other.

A first end of the clamp damping circuit 120 is coupled to a first end of the primary side winding N1. A second end of the clamp damping circuit 120 is coupled to the voltage-reducing circuit 140 (as shown in FIG. 3) or is coupled to the second switch 150 (as shown in FIG. 4). A third end of the clamp damping circuit 120 is coupled to the output end 102. In some embodiments, the clamp damping circuit 120 includes an energy-storage element C1 and a forward conduction element D1. One end (that is, the first end of the clamp damping circuit 120) of the energy-storage element C1 is coupled to the first end of the primary side winding N1 and the output end 102. The other end (that is, the second end of the clamp damping circuit 120) of the energy-storage element C1 is coupled to the voltage-reducing circuit 140 (as shown in FIG. 3) or is coupled to the first end of the second switch 150 (as shown in FIG. 4). In this case, the other end of the energy-storage element C1 is further coupled to a cathode of the forward conduction element D1. An anode (that is, the third end of the clamp damping circuit 120) of the forward conduction element D1 is coupled to a second end of the primary side winding N1. In some embodiments, the clamp damping circuit 120 may further include a resistor R1, and the resistor R1 is connected in parallel with the energy-storage element C1. The energy-storage element C1 may be a capacitor.

In some embodiments, a first end of the first switch 130 is coupled to the second end of the primary side winding N1. A second end of the first switch 130 is coupled to the ground. A control end of the first switch 130 is coupled to a pulse width modulation (PWM) controller (not shown). The first switch 130 may be an N-type metal-oxide-semiconductor FET (NMOSFET). In this case, the first end, the second end and the control end of the first switch 130 are respectively a drain, a source and a gate.

In some embodiments, the voltage-reducing circuit 140 includes a voltage-reducing element N3. In an example, the voltage-reducing element N3 is coupled between the other end of the energy-storage element C1 and the first end of the second switch 150, as shown in FIG. 3. In another example, the voltage-reducing element N3 is coupled between the second end of the second switch 150 and the second end of the primary side winding N1, as shown in FIG. 4. In some embodiments, the voltage-reducing circuit 140 may further include a forward conduction element D2. The forward conduction element D2 is coupled to any position of the energy-releasing path in a manner of using a direction in which a current flows from the energy-storage element C1 to the second end of the primary side winding N1 as a forward direction. For example, the voltage-reducing element N3, the forward conduction element D2 and the second switch 150 are sequentially coupled in series between the other end of the energy-storage element C1 and the second end of the primary side winding N1, as shown in FIG. 3. Alternatively, the second switch 150, the forward conduction element D2 and the voltage-reducing element N3 are sequentially coupled in series between the other end of the energy-storage element C1 and the second end of the primary side winding N1, as shown in FIG. 4. Alternatively, the forward conduction element D2, the second switch 150 and the voltage-reducing element N3 are sequentially coupled in series between the other end of the energy-storage element C1 and the second end of the primary side winding N1, which is not shown. Alternatively, the second switch 150, the voltage-reducing element N3 and the forward conduction element D2 are sequentially coupled in series between the second end of the primary side winding N1 and the other end of the energy-storage element C1, which is not shown. Alternatively, the voltage-reducing element N3, the second switch 150 and the forward conduction element D2 are sequentially coupled in series between the other end of the energy-storage element C1 and the second end of the primary side winding N1, which is not shown. Alternatively, the forward conduction element D2, the voltage-reducing element N3 and the second switch 150 are sequentially coupled in series between the other end of the energy-storage element C1 and the second end of the primary side winding N1, which is not shown. In this case, the forward conduction element D2 limits an output current of the transformer circuit 110 from flowing through a parasitic diode of the second switch 150. The voltage-reducing element N3 may be an auxiliary winding. The second switch 150 may be an NMOSFET. In this case, the first end, the second end and the control end of the first switch 130 are respectively the drain, the source and the gate. In some embodiments, the primary side winding N1 and the auxiliary winding (that is, the voltage-reducing element N3) may be enwound on a same reel. That is, the primary side winding N1 and the auxiliary winding have a same polarity.

The first rectifier filter circuit 160 includes a secondary rectifier circuit. The secondary rectifier circuit may include a forward conduction element D3. An anode of the forward conduction element D3 is coupled to a first end of the secondary side winding N2, and a cathode of the forward conduction element D3 is coupled to the output end 102. In this case, when the transformer circuit 110 generates the second converted voltage, the forward conduction element D3 is cut off because the second converted voltage is less than the output voltage Vo. In some embodiments, the first rectifier filter circuit 160 may further include a secondary filter circuit. The secondary filter circuit may include an output capacity C2, and the output capacity C2 is coupled to the output end 102.

In an operation of an active mode, taking a circuit architecture shown in FIG. 3 as an example, the control end of the first switch 130 receives a switch signal (referred to as a first switch signal S1 below), and a control end of the second switch 150 receives another switch signal (referred to as a second switch signal S2 below). Timing of the first switch signal S1 and the second switch signal S2 is shown in FIG. 5.

Figure 5:
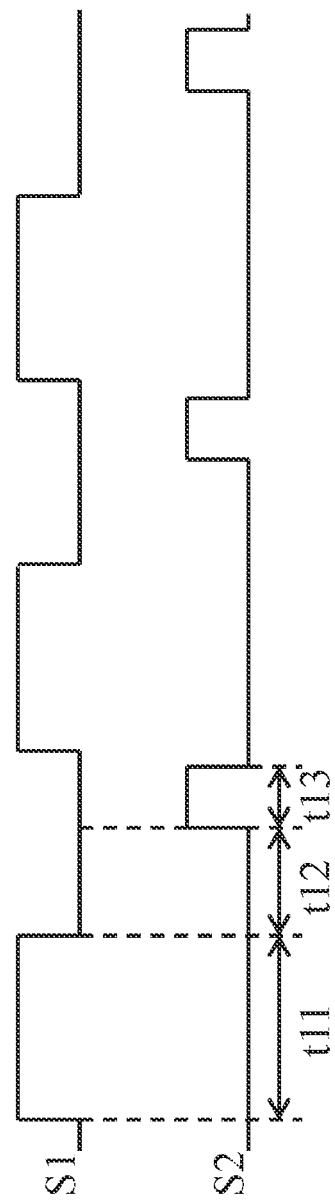
FIG. 5 is a timing diagram of a switch signal in an active mode of the flyback power-converting device of FIG. 3.
Figure 6:
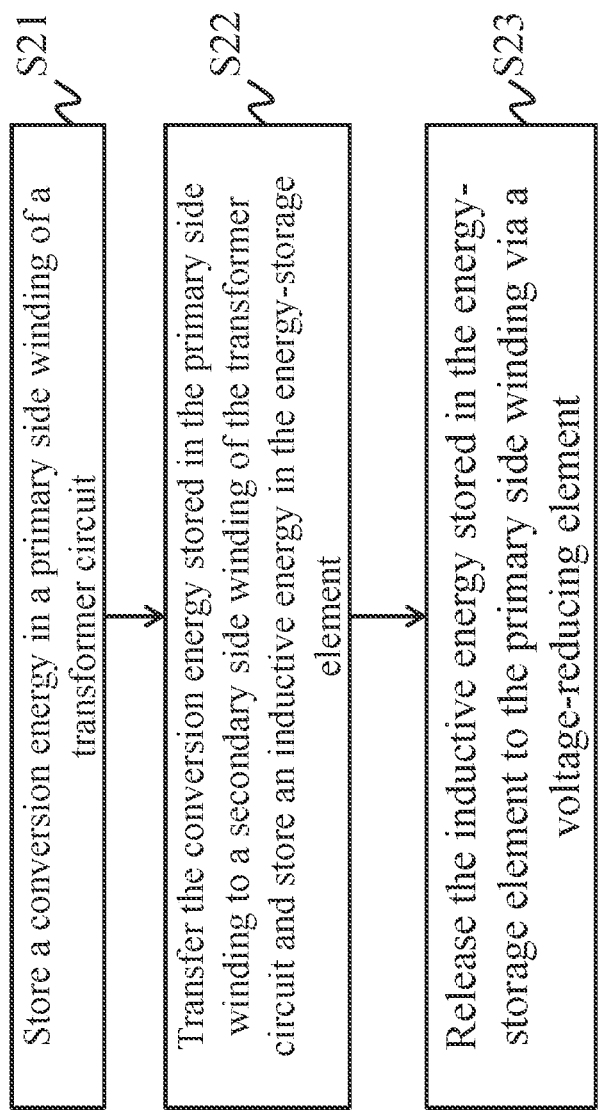
FIG. 6 is a flowchart of a method for flyback converting power according to an embodiment.
Figure 7:
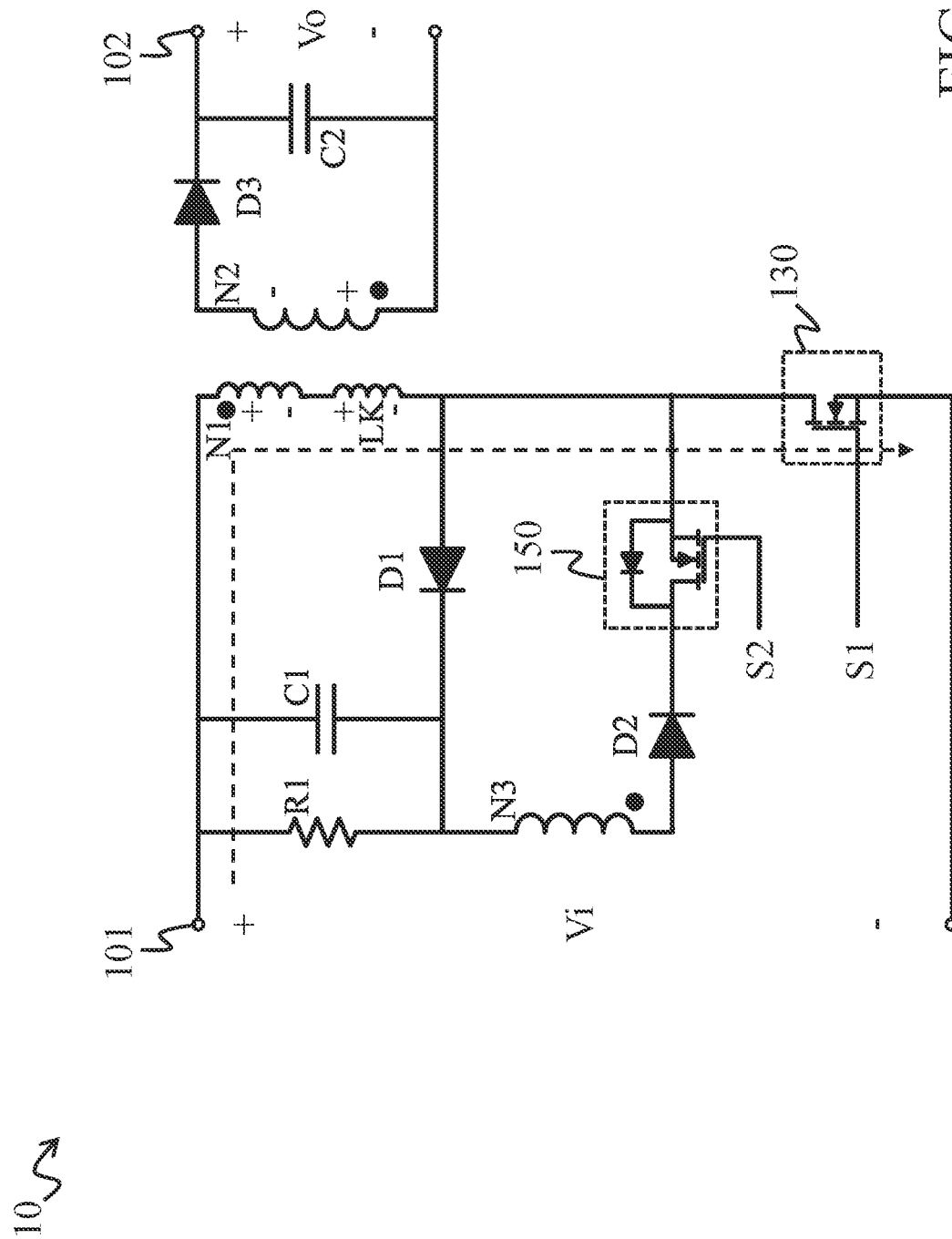
FIG. 7 to FIG. 9 are each a schematic diagram of actions in the active mode of the flyback power-converting device of FIG. 3.

Referring to FIG. 3, FIG. 5 and FIG. 6, during a first time t11, the first switch 130 is turned on, and the second switch 150 is cut off; in this case, the primary side winding N1 receives the input power Vi to store a conversion energy (step S21), as shown in FIG. 7. In FIG. 7, dotted arrows indicate current directions.

Figure 8:
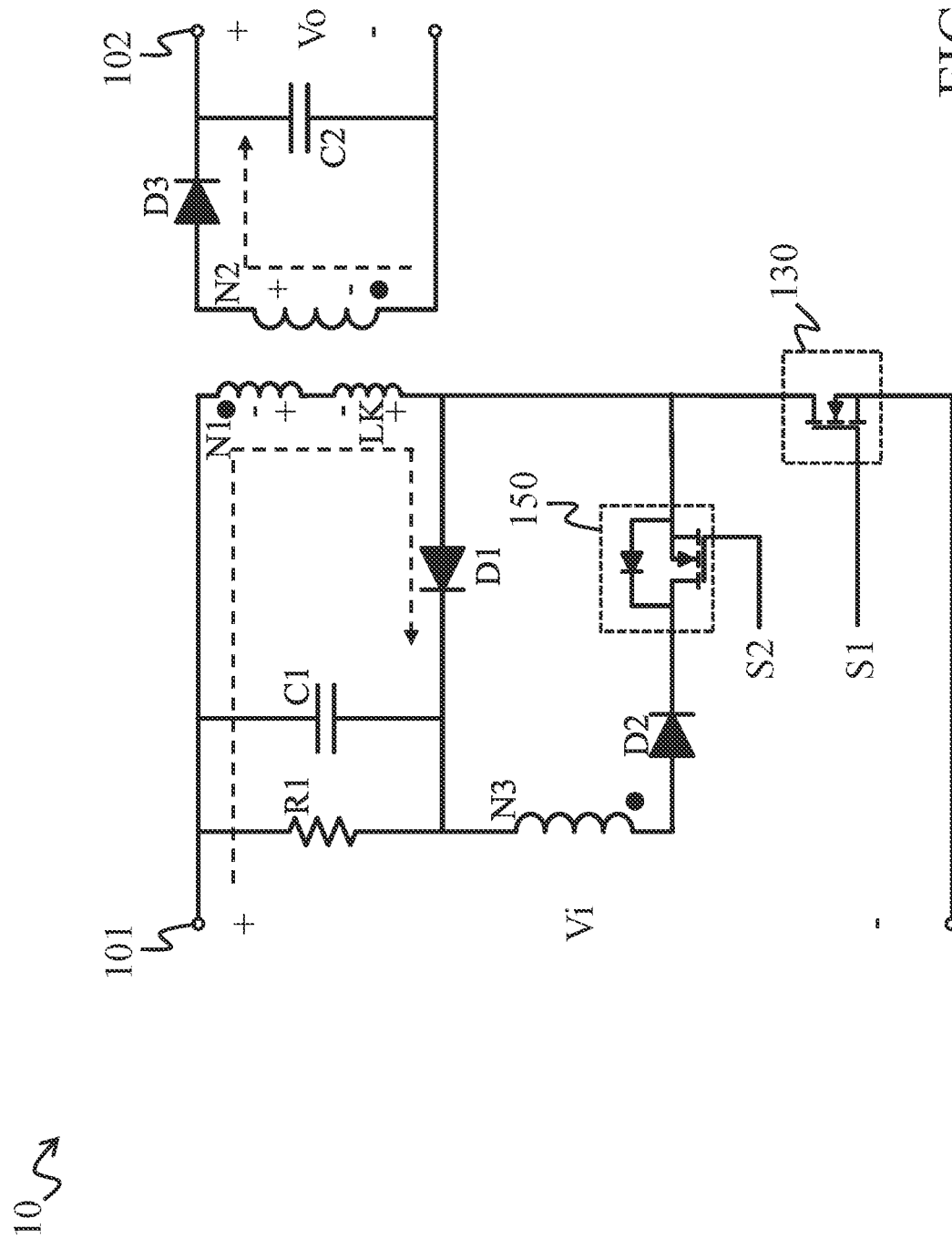

During a second time t12, the first switch 130 is cut off, and the second switch 150 is cut off; in this case, the conversion energy stored in the primary side winding N1 is transferred to the secondary side winding N2, that is, the transformer circuit 110 transfers the input power Vi to a converted voltage via an electromagnetic coupling between the primary side winding N1 and the secondary side winding N2, and charges the energy-storage element C1 via the forward conduction element D1, to enable the energy-storage element C1 to store the inductive energy (step S22), as shown in FIG. 8. In this case, a voltage Vc1 in the energy-storage element C1 is NVo+Vlk. N is a ratio of winding of the primary side winding N1 and the secondary side winding N2, and Vlk is an induced voltage of a leakage Lk generated by the primary side winding N1. In FIG. 8, dotted arrows indicate current directions.

Figure 9:
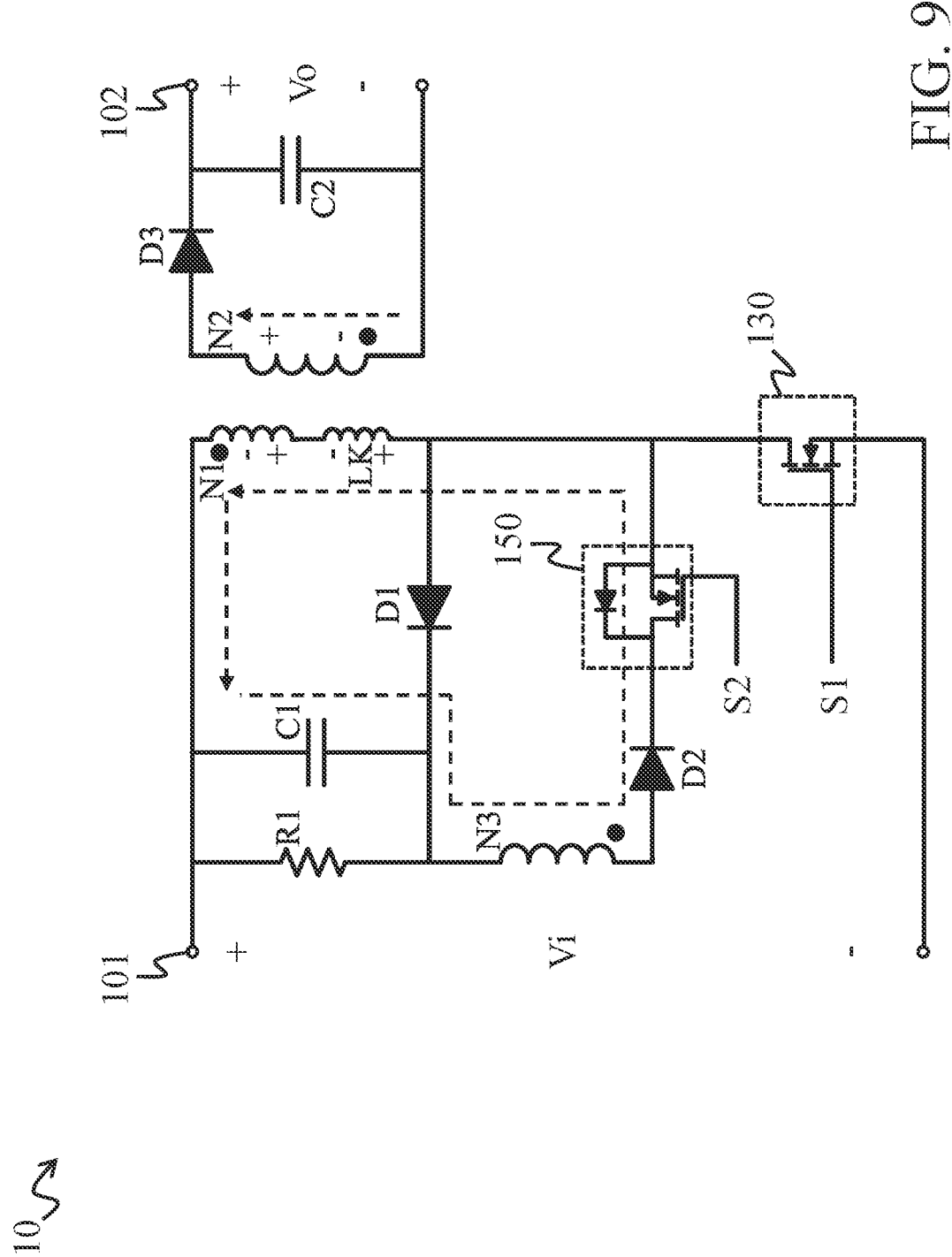
Figure 10:
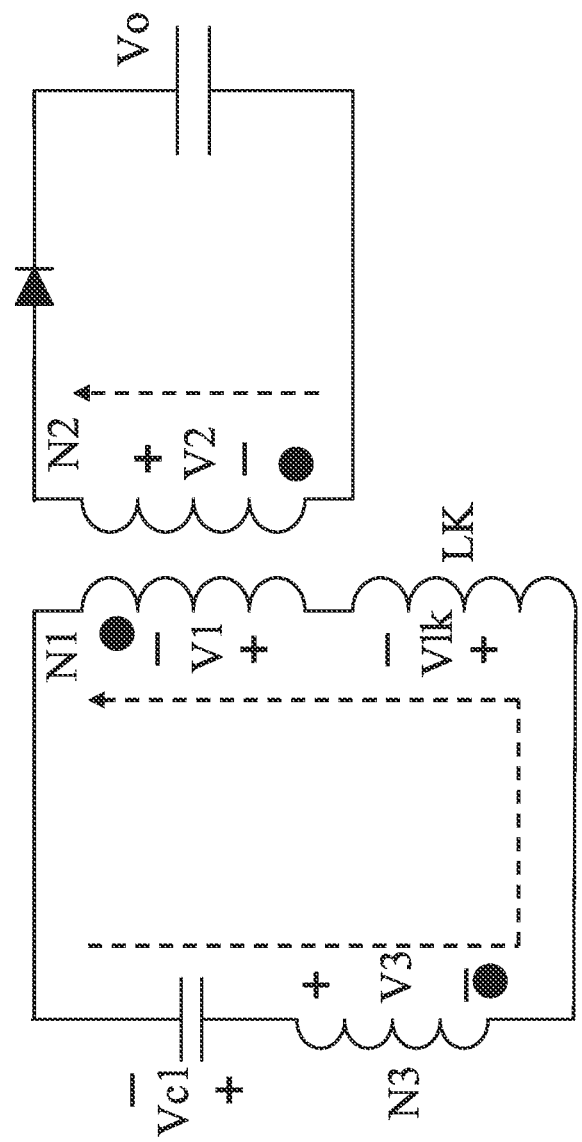
FIG. 10 is an equivalent circuit diagram of the flyback power-converting device of FIG. 9.

During a third time t13, the first switch 130 is cut off, and the second switch 150 is turned on; in this case, the energy-storage element C1 releases the stored inductive energy to the primary side winding N1 via the voltage-reducing element N3 and transfers to the secondary side winding N2 via the electromagnetic coupling between the primary side winding N1 and the secondary side winding N2 (step S23), as shown in FIG. 9. In this case, an equivalent circuit of the flyback power-converting device 10 is shown in FIG. 10. After voltage reducing via the voltage-reducing element N3, a converted voltage (V2) generated by the secondary side winding N2 is less than the output voltage Vo. Therefore, the forward conduction element D3 is cut off. In FIG. 9 and FIG. 10, dotted arrows indicate current directions. V1 is an induced voltage of the primary side winding N1.

For example, assuming that the output voltage Vo is fixed to 20 V (volt), a turn number of the primary side winding N1 is 6, a turn number of the secondary side winding N2 is 1, a turn number of the auxiliary winding (that is, the voltage-reducing element N3) is 1, and the induced voltage Vlk of the leakage Lk is 6 V.

During the second time t12, the voltage Vc1 in the energy-storage element C1 is 126 V as shown in the following formula 1.

$$Vc1 = NVo + Vlk = (N1/N2)*Vo + Vlk \qquad \text{Formula 1}$$
$$= (6/1)*20\text{ V} + 6\text{ V} = 126\text{ V}$$

During the third time t13, the energy-storage element C1 releases energy, and in this case, the converted voltage V2 reflected to the secondary side winding N2 is 17.66 V, as shown in the following formula 2. V3 is an induced voltage of the auxiliary winding (that is, the voltage-reducing element N3).

$$V2=(Vc1-V3)*(N2/N1)=(126-20)(1/6)=17.66V \qquad \text{Formula 2}$$

In this case, because the output voltage Vo is 20 V, the converted voltage V2 reflected to the secondary side winding N2 is 17.66 V, the forward conduction element D3 located in the secondary side of the transformer circuit 110 is not turned on (that is, is cut off), therefore a situation is avoided that the secondary side of the transformer circuit 110 generates a surge current, and the energy released by the energy-storage element C1 will flow back to the energy-storage element C1.

In some embodiments, the flyback power-converting device 10 further includes a flyback mode as an action mode.

Figure 11:
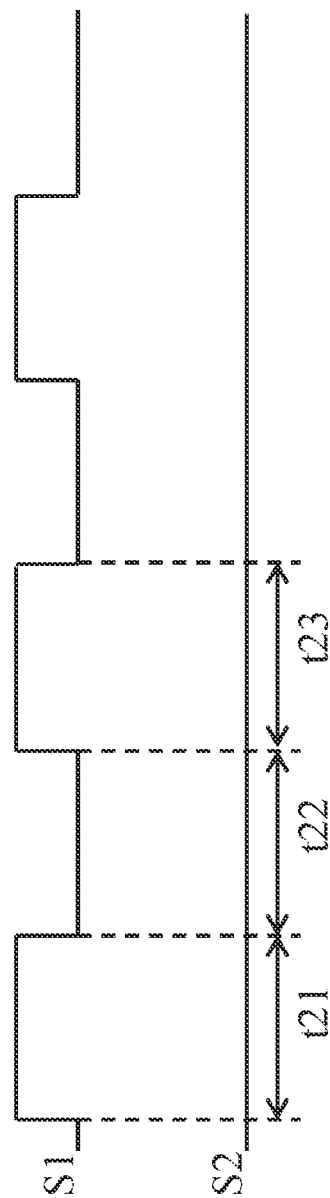
FIG. 11 is a timing diagram of a switch signal in a flyback mode of the flyback power-converting device of FIG. 3.

In an operation of the flyback mode, taking a circuit architecture shown in FIG. 3 as an example, the control end of the first switch 130 receives the first switch signal S1, and the control end of the second switch 150 receives the second switch signal S2. Timing of the first switch signal S1 and the second switch signal S2 is shown in FIG. 11. In this mode, the second switch signal S2 is on a cut-off level. That is, the second switch 150 remains in a cut-off state. The first switch signal S1 switches between a turned-on level and a cut-off level.

Referring to FIG. 3 and FIG. 1, during a first time t21, the first switch 130 is turned on, and the second switch 150 is turned off. In this case, the primary side winding N1 receives the input power Vi to store a conversion energy, as shown in FIG. 7.

During a second time t22, the first switch 130 is cut off, and the second switch 150 is still cut off. In this case, the conversion energy stored in the primary side winding N1 is transferred to the secondary side winding N2. That is, the transformer circuit 110 transfers the input power Vi to a converted voltage via an electromagnetic coupling between the primary side winding N1 and the secondary side winding N2, and charges the energy-storage element C1 via the forward conduction element D1, to enable the energy-storage element C1 to store the inductive energy, as shown in FIG. 8.

Figure 12:
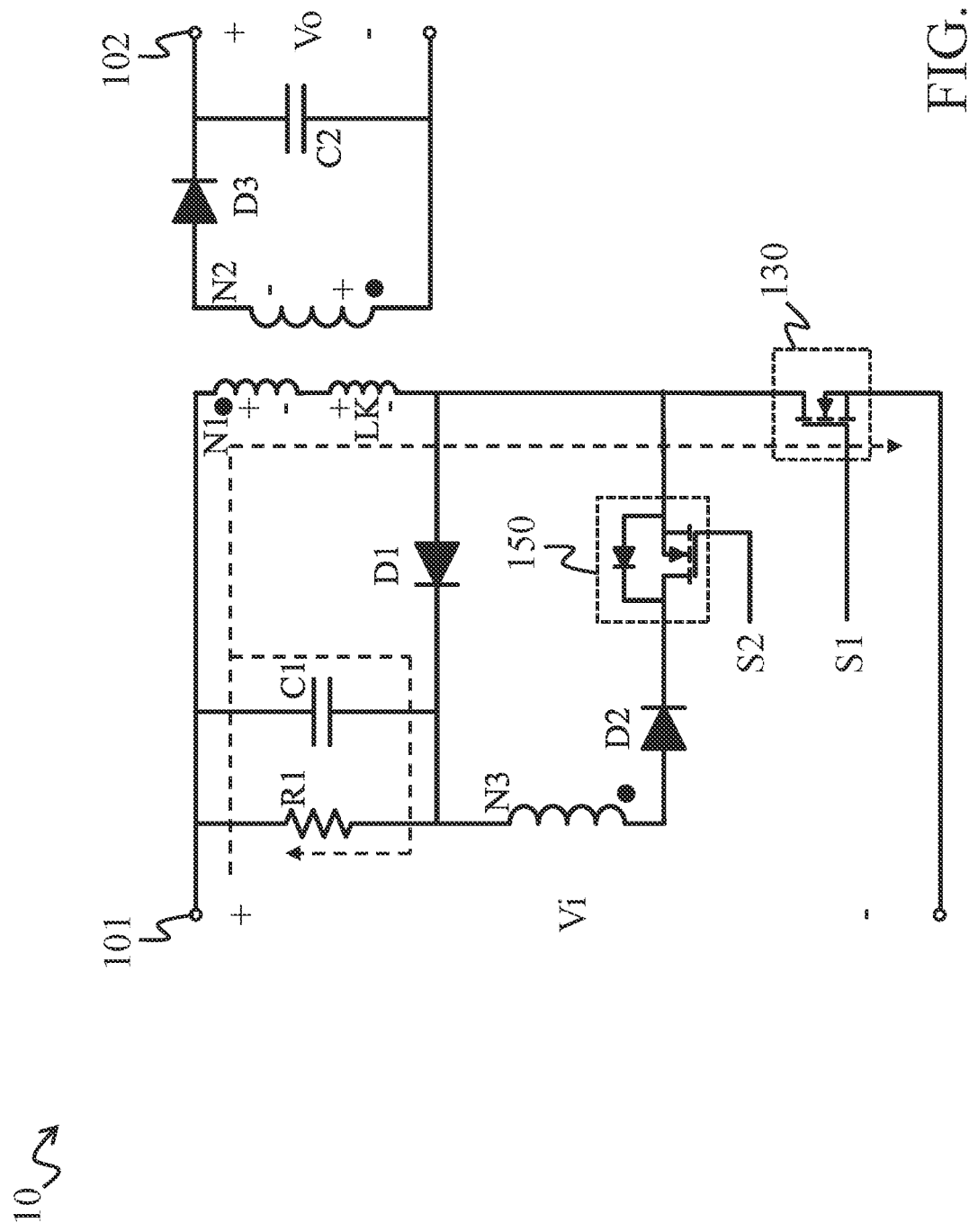
FIG. 12 is a schematic diagram of actions of a step in the flyback mode of the flyback power-converting device of FIG. 3.

During a third time t23, the first switch 130 is turned on again, and the second switch 150 is still cut off. In this case, input energy is again stored in the primary side winding N1, and the stored inductive energy in the energy-storage element C1 is released to the resistor R1, as shown in FIG. 12.

In some embodiments, the foregoing forward conduction elements D1-D3 may be diodes.

Figure 13:
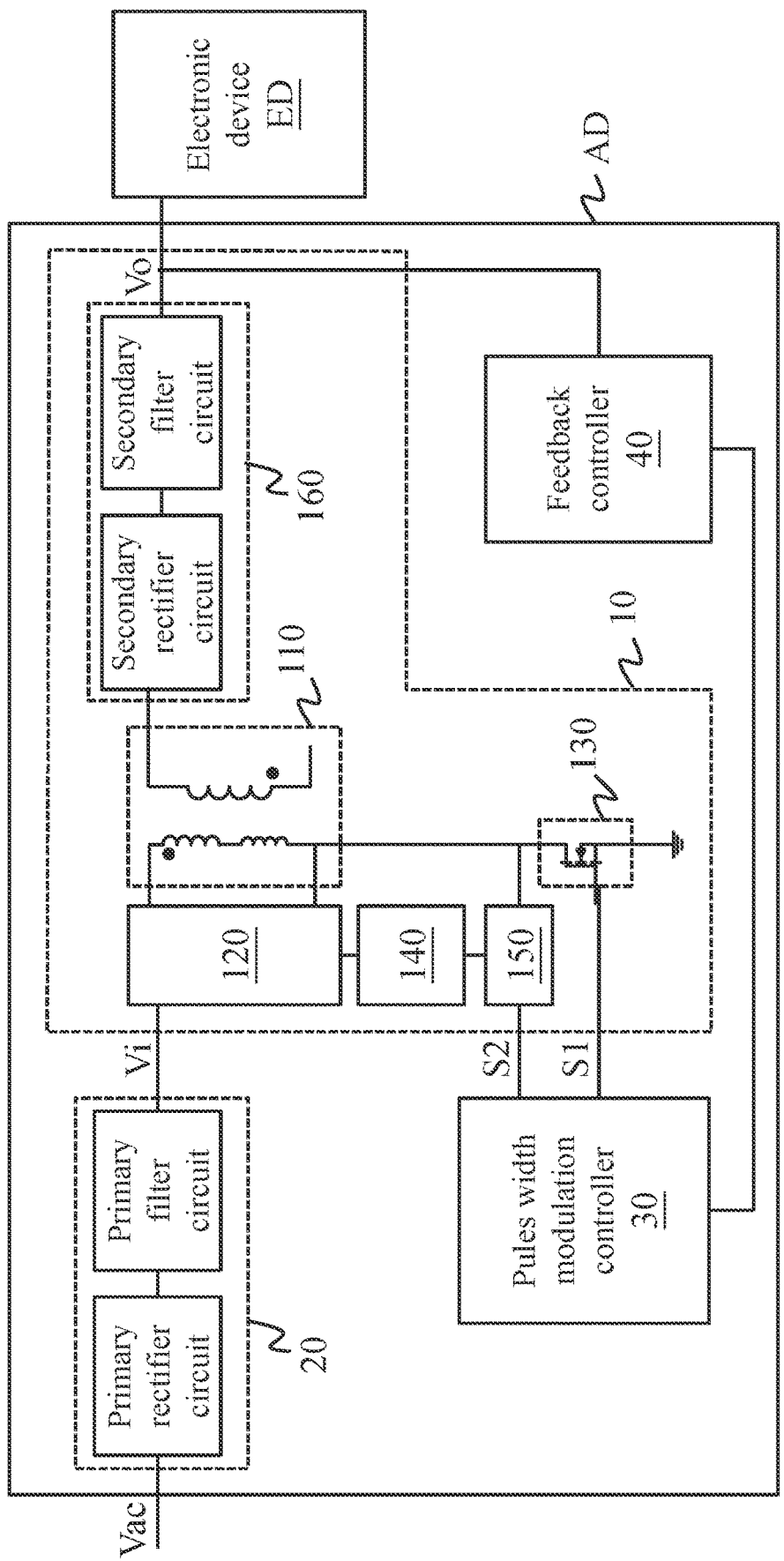
FIG. 13 is block diagram of functions of an adapter according to an embodiment.

In some embodiments, referring to FIG. 13, the flyback power-converting device 10 according to any one of the foregoing embodiments is applicable to an adapter AD. An electronic device ED converts an alternating current power Vac of the mains into the direct current power (that is, the output voltage Vo) via the adapter AD, to supply electricity needed for operation.

The adapter AD includes the flyback power-converting device 10 according to any one of the foregoing embodiments, another rectifier filter circuit (referred to as a second rectifier filter circuit 20 below), a pulse width modulation controller 30 and a feedback controller 40. The second rectifier filter circuit 20 is coupled between the alternating current power Vac and the input end 101 of the flyback power-converting device 10. The pulse width modulation controller 30 is coupled to the control ends of the flyback power-converting device 10 (that is, the control end of the first switch 130 and the control end of the second switch 150). The feedback controller 40 is coupled to the output end 102 of the flyback power-converting device 10 and a feedback end of the pulse width modulation controller 30.

The feedback controller 40 converts the output voltage Vo into a feedback voltage. The pulse width modulation controller 30 generates the first switch signal S1 and the second switch signal S2 according to the feedback voltage. The second rectifier filter circuit 20 receives, and performs rectification and filtering on, the alternating current power Vac so as to generate the input power Vi for the flyback power-converting device 10. The flyback power-converting device 10, based on control of the first switch signal S1 and the second switch signal S2, converts the input power Vi into the output voltage Vo and provides the output voltage Vo for the electronic device ED. The pulse width modulation controller 30 may include a mode control circuit and a pulse width modulation generating circuit. The pulse width modulation generating circuit generates a pulse width modulation signal for the mode control circuit according to the feedback voltage. The mode control circuit generates the first switch signal S1 and the second switch signal S2 according to the feedback voltage and the pulse width modulation signal so as to control an operation mode of the flyback power-converting device 10. In some embodiments, the pulse width modulation controller 30 may be implemented by an integrated circuit (IC).

Figure 14:
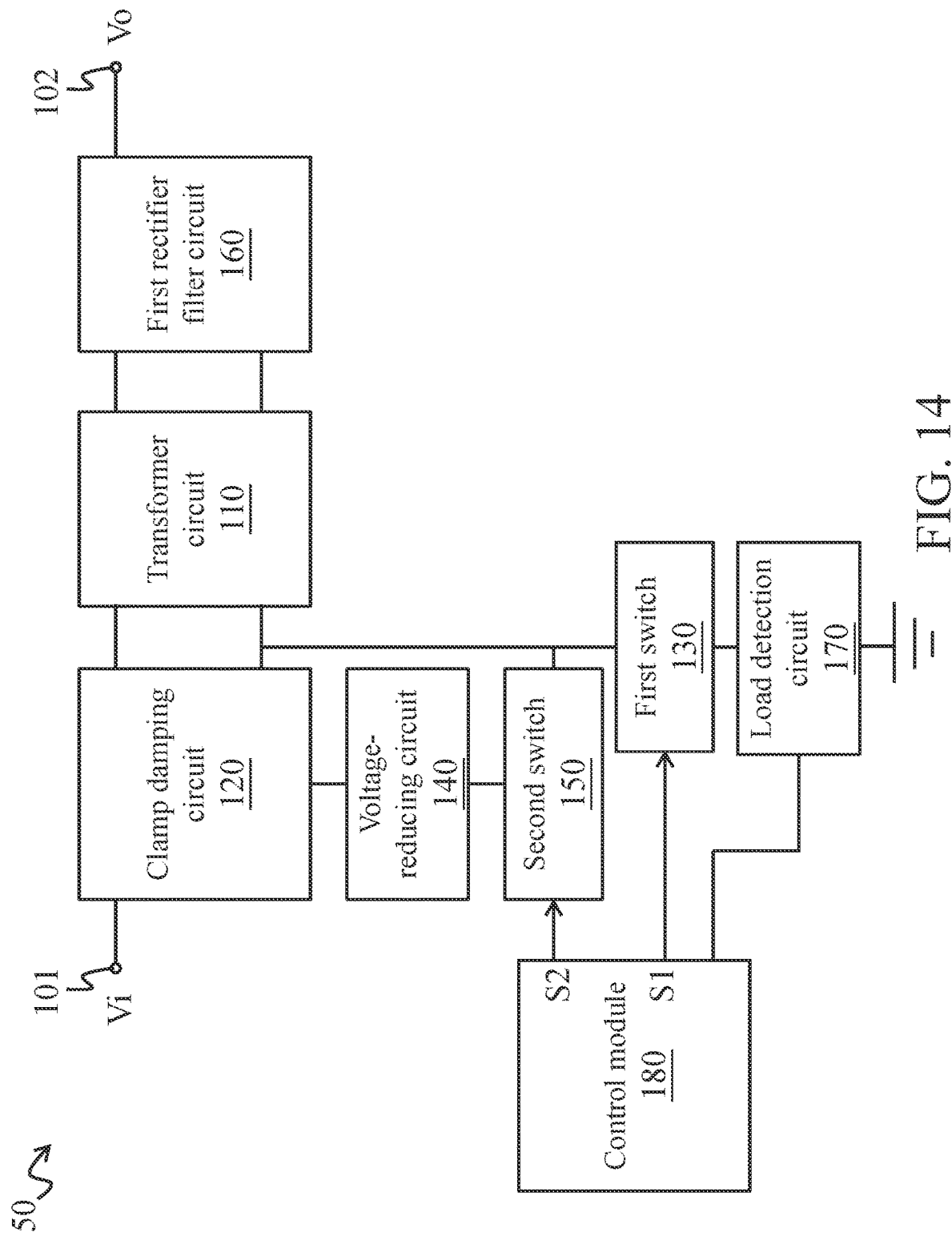
FIG. 14 is a block diagram of a flyback power-converting device according to an embodiment of the present invention.
Figure 15:
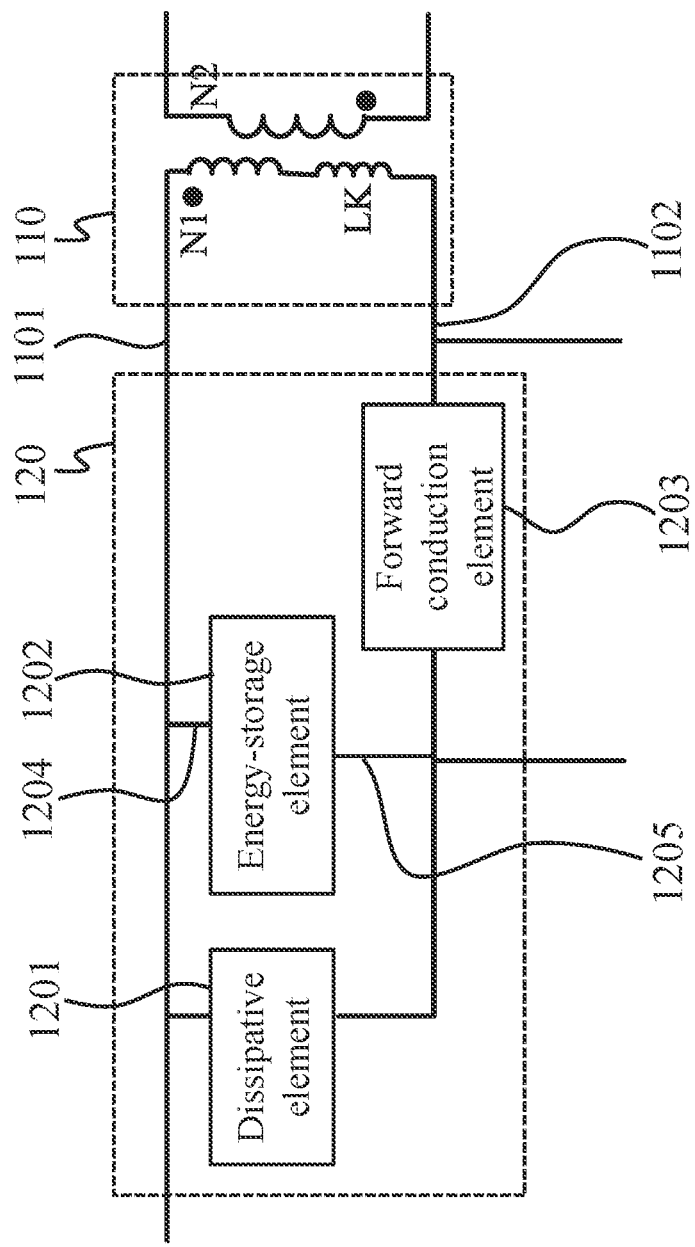
FIG. 15 is a block diagram of a transformer circuit and a clamp damping circuit according to an embodiment of the present invention.

FIG. 14 is a block diagram of a flyback power-converting device according to an embodiment of the present invention. FIG. 15 is a block diagram of a transformer circuit and a clamp damping circuit according to an embodiment of the present invention. Referring to FIG. 14, compared with the flyback power-converting device 10 shown in FIG. 1, the flyback power-converting device 50 shown in FIG. 14 further includes a load detection circuit 170 and a control module 180. In addition, the load detection circuit 170 is coupled between the first switch 130 and the ground.

The load detection circuit 170 detects a load condition of the transformer circuit 110 and generates a load signal. The control module 180 connects the first switch 130, the second switch 150, and the load detection circuit 170. The control module 180 receives the load signal generated by the load detection circuit 170. The control module 180 transmits a first switch signal S1 to the first switch 130, and transmits a second switch signal S2 to the second switch 150 to respectively control turn-on and turn-off of the first switch 130 and the second switch 150.

Referring to FIG. 14 and FIG. 15 together, in this embodiment, the transformer circuit 110 includes a primary side winding N1 and a secondary side winding N2 inductively coupled to the primary side winding N1. A leakage LK is a leakage generated by the primary side winding N1. The clamp damping circuit 120 includes an energy-storage element 1202, a dissipative element 1201 and a forward conduction element 1203. A first end 1204 of the energy-storage element 1202 is coupled to a first end 1101 of the primary side winding N1. The dissipative element 1201 is connected in parallel with the energy-storage element 1202. The forward conduction element 1203 is coupled between a second end 1102 of the primary side winding N1 and a second end 1205 of the energy-storage element 1202.

The first switch 130 is coupled between the second end 1102 of the primary side winding N1 and the ground. The voltage-reducing circuit 140 is coupled between the second end 1205 of the energy-storage element 1202 and the second end 1102 of the primary side winding N1. The second switch 150 is connected in series with the voltage-reducing circuit 140 between the second end 1205 of the energy-storage element 1202 and the second end 1102 of the primary side winding N1.

Figure 16:
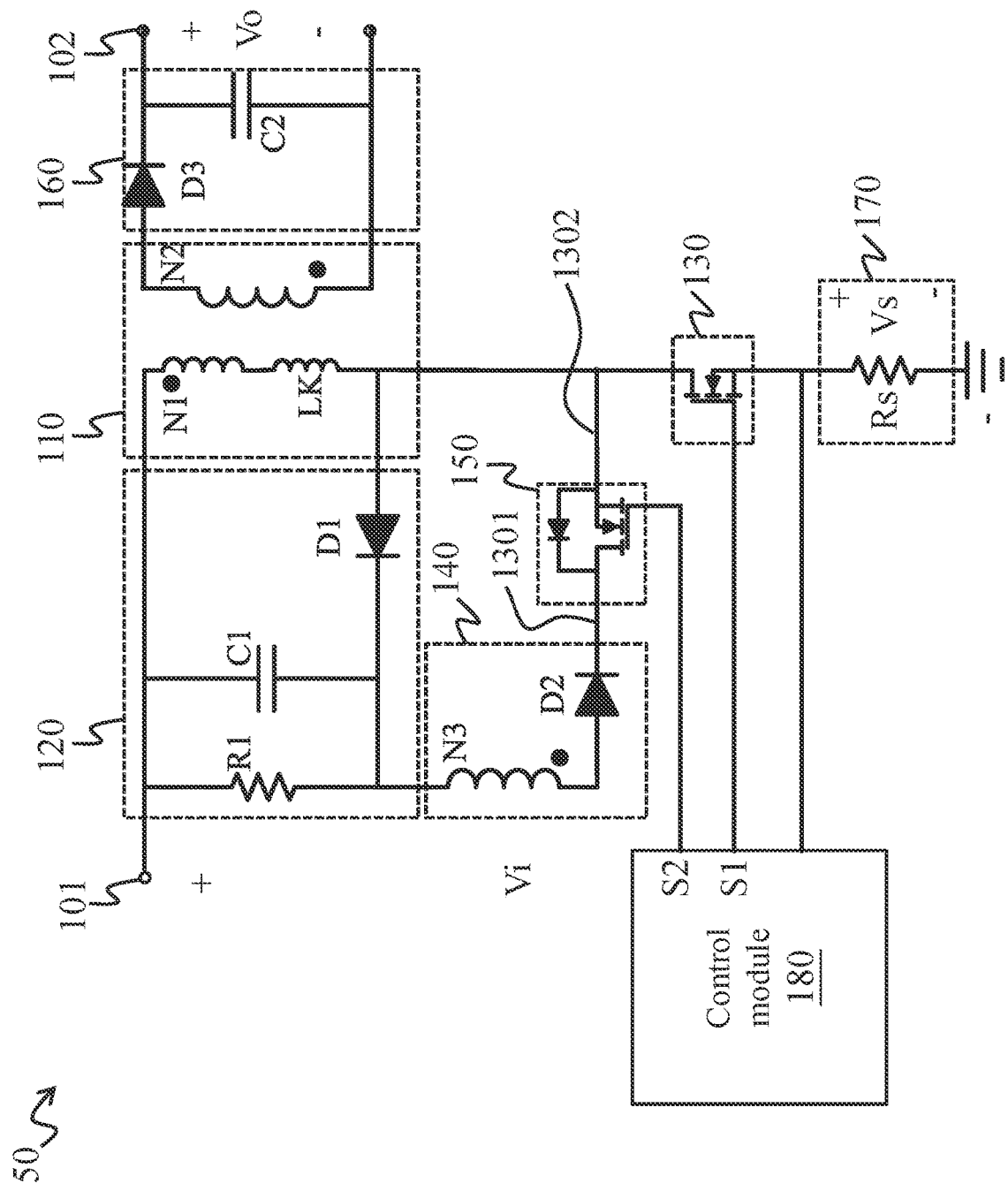
FIG. 16 is an exemplary brief circuit diagram of the flyback power-converting device 50 of FIG. 14 and FIG. 15 according to an embodiment of the present invention.

FIG. 16 is an exemplary brief circuit diagram of the flyback power-converting device 50 of FIG. 14 and FIG. 15 according to an embodiment of the present invention. Refer to FIG. 14, FIG. 15 and FIG. 16 together. In some embodiments, the energy-storage element 1202 is a capacitor C1, the dissipative element 1201 is a resistor R1, and the forward conduction element 1203 is a diode D1. The resistor R1 is a mega ohm resistor. That is to say, a resistance value of the resistor R1 is more than one million ohms. The load detection circuit includes a load resistor Rs. The load resistor Rs generates a voltage drop Vs, and the voltage drop Vs corresponds to the load condition of the transformer circuit 110. In this embodiment, the voltage drop Vs is used as the load signal generated by the load detection circuit 170. The control module 180 receives the load signal (in this embodiment, the load signal is the voltage drop Vs), and compares the load signal (in this embodiment, the load signal is the voltage drop Vs) with a plurality of voltage levels to determine a load condition.

In an embodiment of the present invention, the control module 180 uses 50% of a predetermined full-load voltage as the voltage level. When the load signal (in this embodiment, the load signal is the voltage drop Vs) is less than 50% of the predetermined full-load voltage, the control module 180 determines that the load condition is in a light load condition. When the load signal (in this embodiment, the load signal is the voltage drop Vs) is greater than or equal to 50% of the predetermined full-load voltage, the control module 180 determines that the load condition is in a heavy load condition. It is to be noted that in the present invention, the condition of being in a heavy load condition or in a light load condition may be set as required. The definition of the heavy load and light load is not limited to 50% of the above predetermined full-load voltage. For example, 30% of a predetermined full-load voltage may be used as the voltage level. When the load signal (in this embodiment, the load signal is the voltage drop Vs) is less than 30% of the predetermined full-load voltage, the control module 180 determines that the load condition is in a light load condition. When the load signal (in this embodiment, the load signal is the voltage drop Vs) is greater than or equal to 30% of the predetermined full-load voltage, the control module 180 determines that the load condition is in a heavy load condition.

The voltage-reducing circuit 140 is coupled between the second end 1205 of the energy-storage element 1202 and a first end 1501 of the second switch 150, and the second end 1502 of the second switch 150 is coupled to the second end 1102 of the primary side winding N1. The first rectifier filter circuit 160 shown in FIG. 16 is the same as that in FIG. 3, and details will not be described herein again.

In some embodiments of the present invention, the first switch 130 and the second switch 150 are N-type MOS transistors. A source of the second switch 150 is coupled to the second end 1102 of the primary side winding N1 and a drain of the first switch 130, a drain of the second switch 150 is coupled to the voltage-reducing circuit 140, and a source of the first switch 130 is coupled to the ground through the load resistor Rs. A gate of the first switch 130 and a gate of the second switch 150 are respectively connected to the control module 180.

It should be noted that in the foregoing embodiment, the source of the second switch 150 is coupled to the drain of the first switch 130, and the source of the first switch 130 is coupled to the ground through the load resistor Rs. Therefore, a bootstrap capacitor may be disposed in the circuit of the control module 180, so that when the first switch 130 is turned on, the bootstrap capacitor is charged externally to supply a voltage. When the first switch 130 is turned off and the second switch 150 is turned on, the voltage supplied by the bootstrap capacitor is used as a voltage required to drive the second switch 150.

In some embodiments of the present invention, the voltage-reducing circuit 140 includes an auxiliary winding N3. The auxiliary winding N3 and the primary side winding N1 have a same polarity. When the second switch 150 is turned on, the auxiliary winding N3 generates a voltage drop in a same polarity direction as a voltage on the primary side winding N1, so that the energy-storage element 1202 releases an inductive energy to the transformer circuit 110 via the voltage-reducing circuit 140. In some embodiments, the voltage-reducing circuit 140 further includes another forward conduction element D2. The another forward conduction element D2 is a diode and configured to limit an output current of the transformer circuit 110 from flowing through a parasitic diode of the second switch 150.

Figure 17A:
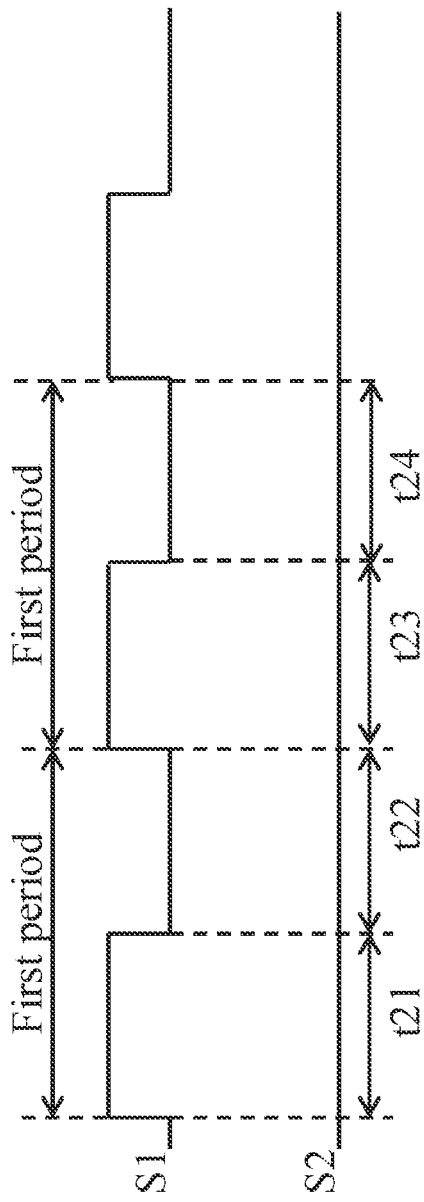
FIG. 17A is a timing diagram of a switch signal in a flyback mode of the flyback power-converting device 50 of FIG. 15 in a light load condition according to an embodiment of the present invention.
Figure 17B:
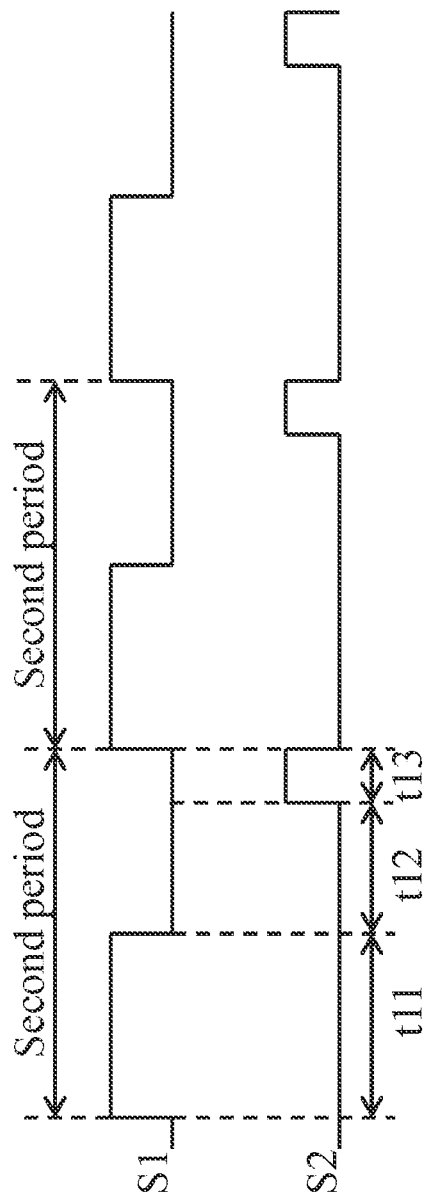
FIG. 17B is a timing diagram of a switch signal in an active mode of the flyback power-converting device 50 of FIG. 15 in a heavy load condition according to an embodiment of the present invention.
Figure 18:
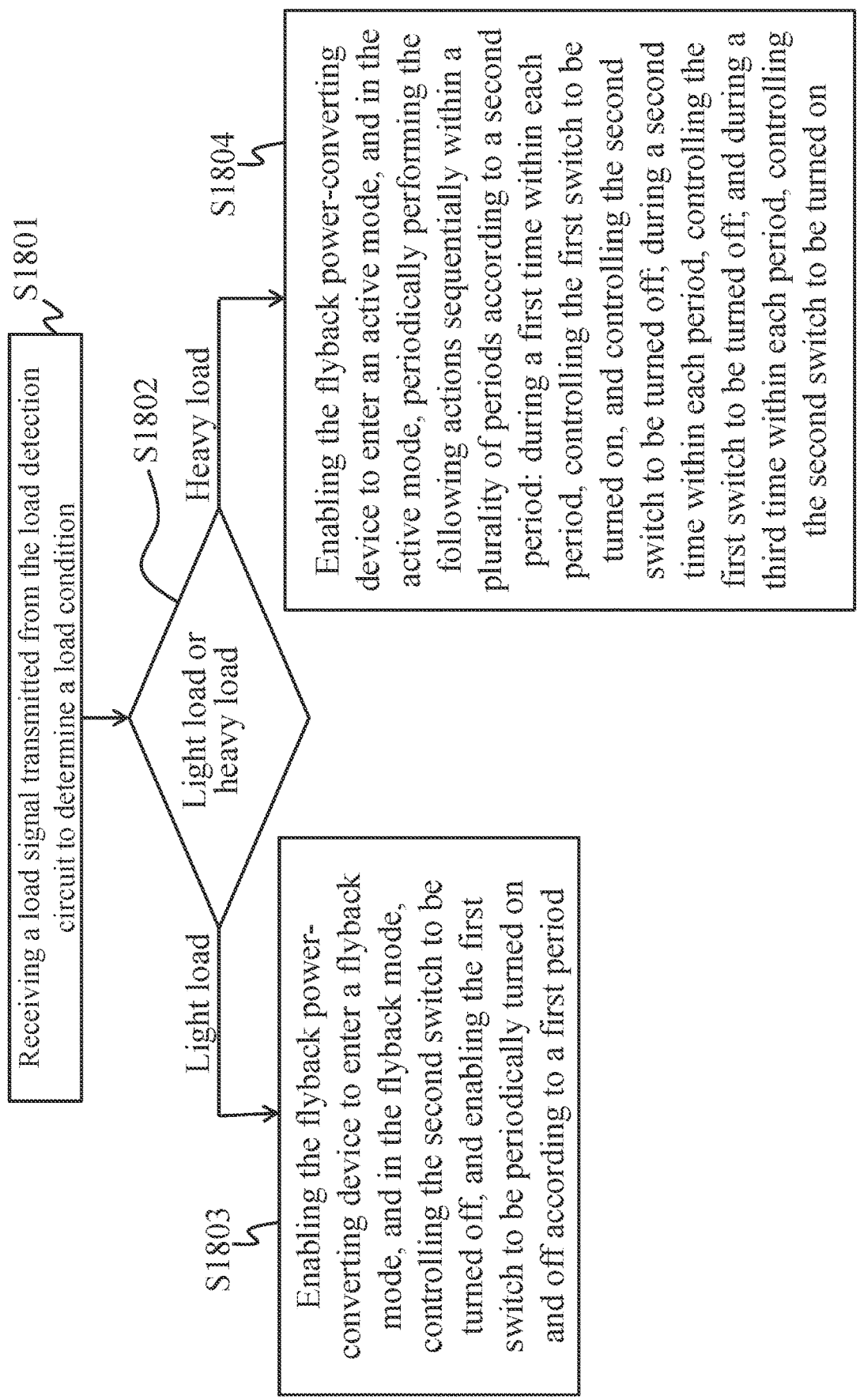
FIG. 18 is a flowchart of a method for flyback converting power according to an embodiment of the present invention.

A method for flyback converting power and cooperation between hardware of a flyback power-converting device 50 according to an embodiment of the present invention are described in detail below with reference to the drawings. FIG. 17A is a timing diagram of a switch signal in a flyback mode of the flyback power-converting device 50 of FIG. 15 in a light load condition according to an embodiment of the present invention. FIG. 17B is a timing diagram of a switch signal in an active mode of the flyback power-converting device 50 of FIG. 15 in a heavy load condition according to an embodiment of the present invention. FIG. 18 is a flowchart of a method for flyback converting power according to an embodiment of the present invention. Refer to FIG. 7, FIG. 8, FIG. 9, FIG. 10, FIG. 12, FIG. 15, FIG. 16, FIG. 17A, FIG. 17B, and FIG. 18 together.

In step S1801, a control module 180 receives a load signal generated by the load detection circuit 170, and determines a load condition according to the load signal in step S1802. If it is determined that the load condition is in a light load condition, the control module 180 performs step S1803. In step S1803, the control module 180 enables the flyback power-converting device 50 to enter a flyback mode. In the flyback mode, as shown in FIG. 17A, the control module 180 controls a second switch 150 to be turned off, and enables a first switch 130 to be periodically turned on and off according to a first period. As shown in FIG. 7, FIG. 8, and FIG. 12, through switching of the first switch 130, the transformer circuit 110 converts an input power Vi to generate a first converted voltage. When the first switch 130 is turned off (during the second time t22 shown in FIG. 17A), the forward conduction element D1 is turned on, and the transformer circuit 110 charges the energy-storage element 1202 via the forward conduction element D1 to enable the energy-storage element 1202 to store an inductive energy (as shown in FIG. 8). When the first switch 130 is turned on (during the second time t23 shown in FIG. 17A), the energy-storage element 1202 releases the inductive energy to the dissipative element 1201 (as shown in FIG. 12).

If it is determined that the load condition is in a heavy load condition, the control module 180 performs step S1804. In step S1804, the control module 180 enables the flyback power-converting device 50 to enter an active mode. In the active mode, the control module 180 periodically executes the following actions sequentially within a plurality of periods according to a second period. (1) During a first time t11 within each period, the first switch 130 is controlled to be turned on, and the second switch 150 is controlled to be turned off. (2) During a second time t12 within each period, the first switch 130 is controlled to be turned off, and at this point, the second switch 150 is still in a turn-off state. (3) During a third time t13 within each period, the second switch is controlled to be turned on, and at this point, the first switch 130 is maintained in a turn-off state.

As shown in FIG. 7, during the first time t11, the primary side winding N1 receives the input power to store a conversion energy therein. As shown in FIG. 8, during the second time t12, the forward conduction element D1 is turned on, and the transformer circuit 110 charges the energy-storage element 1202 via the forward conduction element D1, to enable the energy-storage element 1202 to store an inductive energy. As shown in FIG. 9 and FIG. 10, during the third time t13, the voltage-reducing circuit 140 generates a voltage drop in a same polarity direction as a voltage on the primary side winding N1, so that the energy-storage element 1202 releases the inductive energy to the transformer circuit 110 via the voltage-reducing circuit 140, and the transformer circuit 110 generates a second converted voltage according to the inductive energy.

In conclusion, according to the flyback power-converting device and the method for flyback converting power of the present invention, a surge current can be prevented from being generated on a secondary side when the clamp damping circuit 120 releases energy via an auxiliary switch (that is, the second switch 150), thereby reducing impact on internal components to extend a product service time, restoring the inductive energy to improve produce efficiency, and selecting a relatively low semiconductor rated voltage or current value to reduce costs.

What is claimed is:

1. A flyback power-converting device, comprising:
a transformer circuit, comprising a primary side winding and a secondary side winding inductively coupled to the primary side winding;
a clamp damping circuit, comprising an energy-storage element, a dissipative element, and a forward conduction element, wherein a first end of the energy-storage element is coupled to a first end of the primary side winding, the dissipative element is connected in parallel with the energy-storage element, and the forward conduction element is coupled between a second end of the primary side winding and a second end of the energy-storage element;
a first switch, coupled between the second end of the primary side winding and a ground;
a voltage-reducing circuit, coupled between the second end of the energy-storage element and the second end of the primary side winding;
a second switch, connected in series with the voltage-reducing circuit between the second end of the energy-storage element and the second end of the primary side winding;
a load detection circuit, coupled between the first switch and the ground; and
a control module, connecting the first switch to the second switch, wherein the control module is configured to receive a load signal transmitted from the load detection circuit to determine a load condition, and perform steps of:
in response to the load condition being in a light load condition, enabling the flyback power-converting device to enter a flyback mode, and controlling, during the flyback mode, the second switch to be turned off, and enabling the first switch to be periodically turned on and off according to a first period, wherein through switching of the first switch, the transformer circuit converts an input power to generate a first converted voltage, when the first switch is turned off, the forward conduction element is turned on, the transformer circuit charges the energy-storage element via the forward conduction element to enable the energy-storage element to store an inductive energy, and when the first switch is turned on, the energy-storage element releases the inductive energy to the dissipative element;

in response to the load condition being in a heavy load condition, enabling the flyback power-converting device to enter an active mode, and in the active mode, periodically performing the following actions sequentially within a plurality of periods according to a second period:

during a first time within each period, controlling the first switch to be turned on, and controlling the second switch to be turned off;

during a second time within each period, controlling the first switch to be turned off; and during a third time within each period, controlling the second switch to be turned on, wherein during the first time, the primary side winding receives the input power to store a conversion energy therein, during the second time, the forward conduction element is turned on, and the transformer circuit charges the energy-storage element via the forward conduction element to enable the energy-storage element to store the inductive energy, and during the third time, the voltage-reducing circuit generates a voltage drop in a same polarity direction as a voltage on the primary side winding, so that the energy-storage element releases the induced energy to the transformer circuit via the voltage-reducing circuit, and the transformer circuit generates a second converted voltage according to the inductive energy.

2. The flyback power-converting device according to claim 1, wherein the dissipative element is a resistor, and a resistance value of the resistor is more than one million ohms.

3. The flyback power-converting device according to claim 1, wherein the voltage-reducing circuit is coupled between the second end of the energy-storage element and a first end of the second switch, and a second end of the second switch is coupled to the second end of the primary side winding.

4. The flyback power-converting device according to claim 3, wherein the first switch and the second switch are N-type MOS transistors, a source of the second switch is coupled to the second end of the primary side winding and a drain of the first switch, a drain of the second switch is coupled to the voltage-reducing circuit, and a gate of the first switch and a gate of the second switch are connected to the control module.

5. The flyback power-converting device according to claim 3, wherein the voltage-reducing circuit comprises: an auxiliary winding, wherein the auxiliary winding has a same polarity as the primary side winding, and when the second switch is turned on, the auxiliary winding is configured to generate the voltage drop in the same polarity direction as a voltage on the primary side winding, so that the energy-storage element releases the inductive energy to the transformer circuit via the voltage-reducing circuit.

6. The flyback power-converting device according to claim 5, wherein the voltage-reducing circuit further comprises: another forward conduction element, configured to limit an output current of the transformer circuit from flowing through a parasitic diode of the second switch.

7. The flyback power-converting device according to claim 1, wherein the voltage-reducing circuit comprises: an auxiliary winding, wherein the auxiliary winding has a same polarity as the primary side winding, and when the second switch is turned on, the auxiliary winding is configured to generate the voltage drop in the same polarity direction as a voltage on the primary side winding, so that the energy-storage element releases the inductive energy to the transformer circuit via the voltage-reducing circuit.

8. The flyback power-converting device according to claim 7, wherein the voltage-reducing circuit further comprises: another forward conduction element, configured to limit an output current of the transformer circuit from flowing through a parasitic diode of the second switch.

9. A method for flyback converting power, performed by a control module and applicable to a flyback power-converting device, wherein the flyback power-converting device comprises:

a transformer circuit, comprising a primary side winding and a secondary side winding inductively coupled to the primary side winding;

a clamp damping circuit, comprising an energy-storage element, a dissipative element, and a forward conduction element, wherein a first end of the energy-storage element is coupled to a first end of the primary side winding, the dissipative element is connected in parallel with the energy-storage element, and the forward conduction element is coupled between a second end of the primary side winding and a second end of the energy-storage element;

a first switch, coupled between the second end of the primary side winding and the ground;

a voltage-reducing circuit, coupled between the second end of the energy-storage element and the second end of the primary side winding;

a second switch, connected in series with the voltage-reducing circuit between the second end of the energy-storage element and the second end of the primary side winding; and a load detection circuit, coupled between the first switch and the ground;

the method for flyback converting power comprises:

receiving a load signal transmitted from the load detection circuit to determine a load condition;

in response to the load condition being in a light load condition, enabling the flyback power-converting device to enter a flyback mode, and controlling, during the flyback mode, the second switch to be turned off, and enabling the first switch to be periodically turned on and off according to a first period, wherein through switching of the first switch, the transformer circuit converts an input power to generate a first converted voltage, when the first switch is turned off, the forward conduction element is turned on, the transformer circuit charges the energy-storage element via the forward conduction element to enable the energy-storage element to store an inductive energy, and when the first switch is turned on, the energy-storage element releases the inductive energy to the dissipative element; and in response to the load condition being in a heavy load condition, enabling the flyback power-converting device to enter an active mode, and in the active mode, periodically performing the following actions sequentially within a plurality of periods according to a second period:

during a first time within each period, controlling the first switch to be turned on, and controlling the second switch to be turned off;

during a second time within each period, controlling the first switch to be turned off; and during a third time within each period, controlling the second switch to be turned on, wherein during the first time, the primary side winding receives the input power to store a conversion energy therein, during the second time, the forward conduction element is turned on, and the transformer circuit charges the energy-storage element via the forward conduction element to enable the energy-storage element to store the inductive energy, and during the third time, the voltage-reducing circuit generates a voltage drop in a same polarity direction as a voltage on the primary side winding, so that the energy-storage element releases the induced energy to the transformer circuit via the voltage-reducing circuit, and the transformer circuit generates a second converted voltage according to the inductive energy.

* * * * *